United States Patent
Tsuda

(10) Patent No.: US 11,856,442 B2
(45) Date of Patent: Dec. 26, 2023

(54) CONTROL DEVICE, WIRELESS COMMUNICATION DEVICE, AND METHOD OF CONTROLLING WIRELESS COMMUNICATION SYSTEM

(71) Applicant: Sony Group Corporation, Tokyo (JP)

(72) Inventor: Shinichiro Tsuda, Tokyo (JP)

(73) Assignee: Sony Group Corporation, Tokyo (JP)

( * ) Notice: Subject to any disclaimer, the term of this patent is extended or adjusted under 35 U.S.C. 154(b) by 213 days.

(21) Appl. No.: 17/441,700

(22) PCT Filed: Jan. 6, 2020

(86) PCT No.: PCT/JP2020/000028
§ 371 (c)(1),
(2) Date: Sep. 22, 2021

(87) PCT Pub. No.: WO2020/208882
PCT Pub. Date: Oct. 15, 2020

(65) Prior Publication Data
US 2022/0150747 A1   May 12, 2022

(30) Foreign Application Priority Data
Apr. 12, 2019 (JP) ................. 2019-076009

(51) Int. Cl.
*H04W 28/02* (2009.01)
*H04L 65/80* (2022.01)

(52) U.S. Cl.
CPC ......... *H04W 28/0257* (2013.01); *H04L 65/80* (2013.01); *H04W 28/0236* (2013.01)

(58) Field of Classification Search
CPC ......... H04W 28/0257; H04W 28/0236; H04W 28/18; H04L 65/80; H04L 65/61;
(Continued)

(56) References Cited

U.S. PATENT DOCUMENTS

2004/0057412 A1* 3/2004 Curcio ................. H04W 28/18
370/468
2015/0049249 A1   2/2015 Shao
(Continued)

FOREIGN PATENT DOCUMENTS

JP    2003-509983 A    3/2003
JP    2008-35510 A     2/2008
(Continued)

OTHER PUBLICATIONS

International Search Report and Written Opinion dated Feb. 25, 2020, received for PCT Application PCT/JP2020/000028, Filed on Jan. 6, 2020, 15 pages including English Translation.

*Primary Examiner* — Vinncelas Louis
(74) *Attorney, Agent, or Firm* — XSENSUS LLP

(57) ABSTRACT

It is possible to facilitate setting of a request condition in a wireless communication system.

A capacity calculating unit calculates a wireless communication capacity in a wireless network including a plurality of wireless communication devices on the basis of information regarding a frequency bandwidth used in the wireless network. A wireless communication request condition acquiring unit acquires a request condition of a service provided in wireless communication between predetermined wireless communication devices among the plurality of wireless communication devices. A determination unit determines whether all wireless communication bearers established between the predetermined wireless communication devices satisfy the request condition of the service on the basis of the wireless communication capacity.

14 Claims, 14 Drawing Sheets

(58) Field of Classification Search
CPC ..... H04N 21/43637; H04N 21/440245; H04N 21/440263; H04N 21/44227; H04N 21/4518; H04N 21/6131; H04N 21/643; H04N 21/64738; H04N 21/44004; H04M 15/8016; A61B 17/0057
See application file for complete search history.

(56) References Cited

U.S. PATENT DOCUMENTS

| | | |
|---|---|---|
| 2015/0334388 A1 | 11/2015 | Rabii |
| 2017/0251274 A1* | 8/2017 | Fujii ................ H04N 21/44004 |
| 2018/0115795 A1 | 4/2018 | Chinnaiyan |
| 2019/0082356 A1* | 3/2019 | Ode ................ H04M 15/8016 |
| 2023/0157679 A1* | 5/2023 | Walters .............. A61B 17/0057 |
| | | 606/213 |

FOREIGN PATENT DOCUMENTS

| | | |
|---|---|---|
| JP | 2009-159087 A | 7/2009 |
| JP | 2015-53565 A | 3/2015 |

\* cited by examiner

Fig. 2

| QCI | Resource Type | Priority Level | Packet Delay Budget | Packet Error Loss | Example Services |
|---|---|---|---|---|---|
| 1 | GBR | 2 | 100ms | $10^{-2}$ | Conversational Voice |
| 2 | | 4 | 150ms | $10^{-3}$ | Conversational Video (Live Streaming) |
| 3 | | 3 | 50ms | $10^{-3}$ | Real Time Gaming, V2X messages Electricity distribution – medium voltage Process automation – monitoring |
| 4 | | 5 | 300ms | $10^{-6}$ | Non-Conversational Video (Buffered Streaming) |
| 65 | | 0.7 | 75ms | $10^{-2}$ | Mission Critical user plane Push To Talk voice |
| 66 | | 2 | 100ms | $10^{-2}$ | Non-Mission-Critical user plane Push To Talk voice |
| 67 | | 1.5 | 100ms | $10^{-3}$ | Mission Critical Video user plane |
| 75 | | 2.5 | 50ms | $10^{-2}$ | V2X messages |
| 5 | Non-GBR | 1 | 100ms | $10^{-6}$ | IMS Signalling |
| 6 | | 6 | 300ms | $10^{-6}$ | Video (Buffered Streaming) TCP-based (e.g., www, e-mail, chat, ftp, p2p file sharing, progressive video, etc.) |
| 7 | | 7 | 100ms | $10^{-3}$ | Voice, Video (Live Streaming) Interactive Gaming |
| 8 | | 8 | 300ms | $10^{-6}$ | Video (Buffered Streaming) TCP-based (e.g., www, e-mail, chat, ftp, p2p file sharing, progressive video, etc.) |
| 9 | | 9 | | | |
| 69 | | 0.5 | 60ms | $10^{-6}$ | Mission Critical delay sensitive signalling (e.g., MC-PTT signalling, MC Video signalling) |
| 70 | | 5.5 | 200ms | $10^{-6}$ | Mission Critical Data |
| 79 | | 6.5 | 50ms | $10^{-2}$ | V2X messages |
| 80 | | 6.8 | 10ms | $10^{-6}$ | Low latency eMBB applications (TCP/UDP-based); Augmented Reality |

Fig. 4

| CONNECTION SOURCE (DESTINATION) DEVICE | CONNECTION DESTINATION (SOURCE) DEVICE | IMAGE QUALITY | LATENCY |
|---|---|---|---|
| VIDEO SCOPE | VIDEO SYSTEM CENTER | 4K | 10ms |
| VIDEO SYSTEM CENTER | COLOR MONITOR | FULL HD | 10ms |
| VIDEO SYSTEM CENTER | IMAGE RECORDING DEVICE | 4K | 100ms |

Fig. 5

| CONNECTION SOURCE (DESTINATION) DEVICE | CONNECTION DESTINATION (SOURCE) DEVICE | IMAGE QUALITY | LATENCY | PRIORITY |
|---|---|---|---|---|
| VIDEO SCOPE | VIDEO SYSTEM CENTER | 4K | 10ms | IMAGE QUALITY |
| VIDEO SYSTEM CENTER | COLOR MONITOR | FULL HD | 10ms | LATENCY |
| VIDEO SYSTEM CENTER | IMAGE RECORDING DEVICE | 4K | 100ms | IMAGE QUALITY |

Fig. 6

| CONNECTION SOURCE (DESTINATION) DEVICE | CONNECTION DESTINATION (SOURCE) DEVICE | IMAGE QUALITY | LATENCY |
|---|---|---|---|
| VIDEO SCOPE | VIDEO SYSTEM CENTER | WIRED | WIRED |
| VIDEO SYSTEM CENTER | COLOR MONITOR | FULL HD | 10ms |
| VIDEO SYSTEM CENTER | IMAGE RECORDING DEVICE | 4K | 100ms |

Fig. 7

| CONNECTION SOURCE (DESTINATION) DEVICE | CONNECTION DESTINATION (SOURCE) DEVICE | IMAGE QUALITY | LATENCY |
|---|---|---|---|
| VIDEO SCOPE | VIDEO SYSTEM CENTER | 4K | 10ms |
| VIDEO SYSTEM CENTER | COLOR MONITOR | FULL HD | 10ms |
| VIDEO SYSTEM CENTER | IMAGE RECORDING DEVICE | PUBLIC NETWORK | PUBLIC NETWORK |

Fig. 13
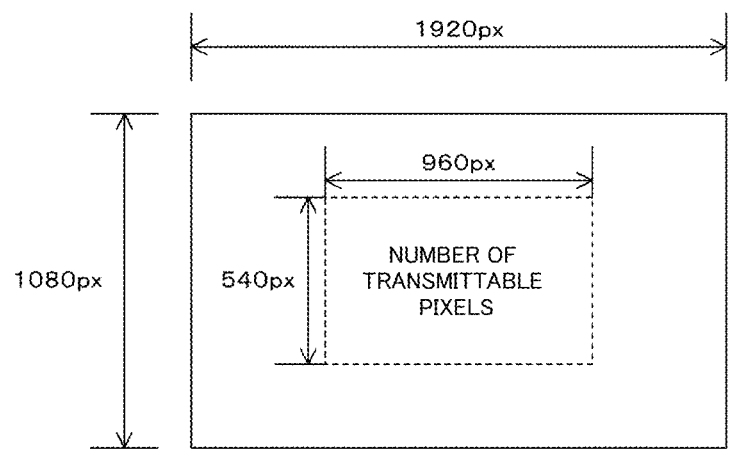
a  SETTING AT DEFAULT
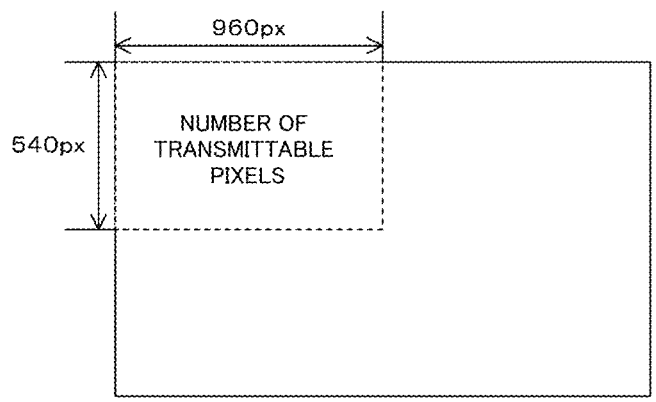
b  WHEN CENTER (480 px, 270 px) OF DESIGNATED RANGE IS SET

CONTROL DEVICE, WIRELESS COMMUNICATION DEVICE, AND METHOD OF CONTROLLING WIRELESS COMMUNICATION SYSTEM

CROSS-REFERENCE TO RELATED APPLICATIONS

The present application is based on PCT filing PCT/JP2020/000028, filed Jan. 6, 2020, which claims priority to JP 2019-076009, filed Apr. 12, 2019, the entire contents of each are incorporated herein by reference.

TECHNICAL FIELD

The present technology relates a wireless communication system. Specifically the present technology relates to a wireless communication system in which a request condition is set in a wireless communication bearer established between wireless communication devices.

BACKGROUND ART

In recent years, a 5th generation (5G) new radio (NR) which is a next-generation mobile wireless communication system has attracted attention because of characteristics of ultra-high speed, low delay high reliability and multiple simultaneous connection. Thus, application fields of wireless communication systems are becoming widespread. In such circumstances, for example, movement from wired connection to wireless connection between devices has become active due to complicated installation of cables between devices used in factories, operation rooms, and the like. In the case of wired connection, transmission characteristics can be guaranteed independently from connection between other devices by connecting the devices via cables. On the other hand, in the case of wireless connection, a dynamic quality-of-service (QoS) management method is required to obtain desired characteristics of connection between any devices because it is necessary to perform communication between a plurality of devices with the same frequency bandwidth. Therefore, for example, a communication method of performing communication with service quality specified by a user of a terminal device has been proposed (for example, see PTL 1).

CITATION LIST

Patent Literature

[PTL 1]
Japanese Translation of PCT Application No. 2003-509983

SUMMARY

Technical Problem

In the above-described technology of the related art, communication is established with the specific service quality. However, since a plurality of wireless communication bearers which are QoS management targets can be established, it is difficult to determine whether the wireless communication bearers are within the entire wireless communication capacity. On the other hand, for example, medical devices to be used are changed in accordance with kinds of operations or inspections in operation rooms and kinds of industrial devices or robots to be used are changed in accordance with kinds of work or processes in factories. Therefore, it is necessary to change configurations of networks frequently. In such circumstances, setting wireless communication may be a barrier to people who have no wireless technical knowledge.

The present technology has been devised in such circumstances and an objective of the present technology is to facilitate setting of a request condition in a wireless communication system.

Solution to Problem

To solve the above-described problems, according to a first aspect of the present technology a control device includes a capacity calculating unit configured to calculate a wireless communication capacity in a wireless network including a plurality of wireless communication devices on the basis of information regarding a frequency bandwidth used in the wireless network; a wireless communication request condition acquiring unit configured to acquire a request condition of a service provided in wireless communication between predetermined wireless communication devices among the plurality of wireless communication devices; and a determination unit configured to determine whether all wireless communication bearers established between the predetermined wireless communication devices satisfy the request condition of the service on the basis of the wireless communication capacity. A control method for the control device is provided. Thus, an operational effect is obtained in that it is determined on the basis of a wireless communication capacity calculated from information regarding a frequency bandwidth whether all the wireless communication bearers established between predetermined wireless communication devices satisfy a request condition of a service.

According to the first aspect of the present technology the request condition of the service may include at least one of an image quality condition and a latency condition. Thus, an operational effect is obtained in that setting the request condition is facilitated and operability is improved.

According to the first aspect of the present technology the request condition of the service may include an image quality condition, a latency condition, and information indicating which condition is prioritized between the image quality condition and the latency condition. Thus, an operational effect is obtained in that it is possible to set a condition which is more weighted between an image quality condition and a latency condition.

According to the first aspect of the present technology the request condition of the service may include a data rate condition instead of the image quality condition. That is, the image quality condition and the data rate condition have a one-to-one relation.

According to the first aspect of the present technology, the determination unit may set a QCI satisfying the request condition of the service as a candidate and determine that all the wireless communication bearers satisfy the request condition of the service when all the wireless communication bearers satisfy the set QCI. Thus, an operational effect is obtained in that the QCI is used as a determination indicator of the request condition of the service.

According to the first aspect of the present technology, the determination unit may determine that all the wireless communication bearers satisfy the request condition of the service when a sum of bit rates corresponding to the set QCI is equal to or less than the wireless communication capacity. Thus, an operational effect is obtained in that comparison with the wireless communication capacity is made using the bit rate corresponding to the QCI.

According to the first aspect of the present technology, the determination unit may use a minimum guarantee bit rate as the bit rate when a resource type of the set QCI is bit rate guarantee, and use an aggregate maximum bit rate as the bit rate when the resource type of the set QCI is bit rate non-guarantee. Thus, an operational effect is obtained in that comparison with the wireless communication capacity is made using the bit rate of the resource type corresponding to the QCI.

According to the first aspect of the present technology the control device may further include a notifying unit configured to notify that all the wireless communication bearers do not satisfy the request condition of the service when it is determined that all the wireless communication bearers do not satisfy the request condition of the service. Thus, an operational effect is obtained in that reconsideration is prompted when the request condition of the service is not satisfied.

According to the first aspect of the present technology, the wireless communication request condition acquiring unit may acquire a request condition of a new service input with regard to the notification. On the basis of the wireless communication capacity the determination unit may determine whether all the wireless communication bearers established between the predetermined wireless communication devices satisfy the request condition of the new service. Thus, an operational effect is obtained in that it is determined on the basis of the wireless communication capacity calculated from the information regarding the frequency bandwidth whether the request condition of the re-input new service is satisfied.

According to a second aspect of the present technology a control device includes: a wireless communication request condition acquiring unit configured to acquire a request condition of a service provided with regard to wireless communication between predetermined wireless communication devices forming a wireless network; and an image control unit configured to generate a bit rate necessary to satisfy the request condition of the service and perform image supply control on a wireless communication device of an image supply source in accordance with whether a wireless communication bearer established between the predetermined wireless communication devices satisfies the generated bit rate.

A control method for the control device is provided. Thus, an operational effect is obtained in that the image supply control is performed on the wireless communication device of the image supply source in accordance with whether the established wireless communication bearer satisfies the bit rate necessary to satisfy the request condition of the service.

According to the second aspect of the present technology the image control unit may acquire a bit rate corresponding to a QCI identified for the wireless communication bearer and perform the image supply control in accordance with whether the bit rate corresponding to the QCI satisfies the generated bit rate. Thus, an operational effect is obtained in that the QCI is used as a determination indicator of the image control.

According to the second aspect of the present technology when the bit rate corresponding to the QCI does not satisfy the generated bit rate, the image control unit may calculate a transmittable range of an image at the bit rate corresponding to the QCI and notify the wireless communication device of the image supply source of the range. Thus, an operational effect is obtained in that the range of the image supplied to the wireless communication device is controlled.

According to the second aspect of the present technology the image control unit may notify of the range of the image in a frame unit. Thus, an operational effect is obtained in that the range of the image supplied to the wireless communication device is controlled for each frame.

According to the second aspect of the present technology the image control unit may notify of a method of processing a range other than the range along with the range of the image. Thus, an operational effect is obtained in that the processing method for the range other than the range of the image supplied to the wireless communication device is controlled. In this case, the processing method for the other range may be a method of decreasing the frame rate or may be a method of decreasing the resolution.

According to a third aspect of the present technology a wireless communication device includes: a receiving unit configured to receive an instruction of a transmittable range of an image and a request condition of a service to be provided in a wireless communication bearer established with another wireless communication device forming a wireless network; an image processing unit configured to perform image processing on a predetermined image in response to the instruction; and a transmitting unit configured to supply the image subjected to the image processing to the other wireless communication device. Thus, an operational effect is obtained in that the image processing is performed in response to an instruction for the request condition of the service and the transmittable range of the image.

BRIEF DESCRIPTION OF DRAWINGS

FIG. 2 is a diagram illustrating part of a definition of a QCI in 3GPP (3GPP TS 23.203).

FIG. 4 is a diagram illustrating a first setting example of a request condition for the endoscope system according to the embodiment of the present technology.

FIG. 5 is a diagram illustrating a second setting example of the request condition for the endoscope system according to the embodiment of the present technology.

FIG. 6 is a diagram illustrating a re-setting example of the first setting example of the request condition for the endoscope system according to the embodiment of the present technology.

FIG. 7 is a diagram illustrating a re-setting example of a second setting example of the request condition for the endoscope system according to the embodiment of the present technology.

FIG. 13 is a diagram illustrating an exemplary aspect of image processing according to the second embodiment of the present technology.

DESCRIPTION OF EMBODIMENTS

Hereinafter, modes for carrying out the present technology (hereinafter referred to as embodiments) will be described. The description will be made in the following order.
1. First embodiment (example in which request condition of service is determined based on wireless communication capacity)
2. Second embodiment (example in which image processing is performed in accordance with bit rate corresponding to QCI)

1. First Embodiment

[Wireless Communication System]

Figure 1:
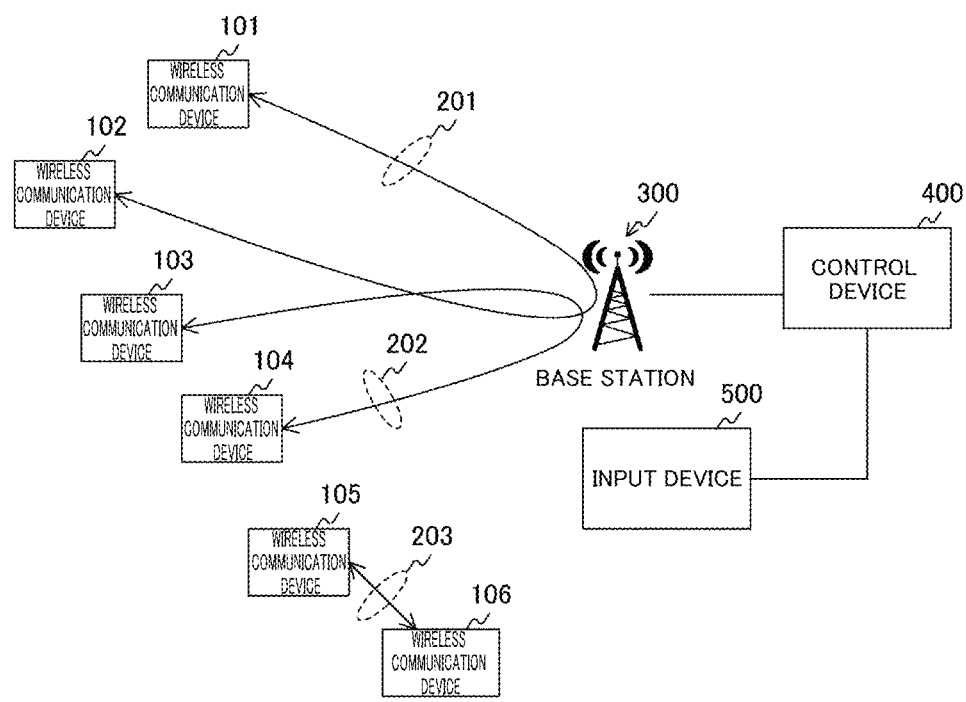
FIG. 1 is a diagram illustrating an example of an entire configuration of a wireless communication system according to an embodiment of the present technology.

FIG. 1 is a diagram illustrating an example of an entire configuration of a wireless communication system according to an embodiment of the present technology.

The wireless communication system is a system that performs wireless communication in a private network. The private network has a broad network form that includes a form called a non-public network or a neutral host network (NHN). The private network may be called a local area network (LAN) or a local area data network (LADN). The wireless communication system includes wireless communication devices 101 to 106, a base station 300, a control device 400, and an input device 500.

The wireless communication devices 101 to 106 are terminal devices or various kinds of devices that perform wireless communication in the wireless communication system. The wireless communication device is also called user equipment (UE). As the wireless communication devices 101 to 106, for example, manufacturing devices in a factory, medical devices in an operation room, and the like are assumed.

The base station 300 is a base station that relays wireless communication in the wireless communication system. The base station 300 relays and manages, for example, wireless communication 201 between the wireless communication devices 101 and 102 and wireless communication 202 between the wireless communication devices 103 and 104. The base station 300 also manages device-to-device (D2D) communication 203 between the wireless communication devices 105 and 106. When the wireless communication system conforms with a system of 3GPP EUTRA (LTE), the base station 300 may be an eNodeB (eNB) or an en-gNodeB (en-gNB). An eNodeB (eNB) and an en-gNodeB (en-gNB) may be called an EUTRAN node. Further or instead of this, when the wireless communication system conforms with a system of 3GPP NR, the base station 300 may be an gNodeB (gNB) or an ng-eNodeB (ng-eNB). An gNodeB (gNB) or an ng-eNodeB (ng-eNB) may be called an NGRAN node.

The control device 400 manages and controls quality-of-service (QoS) which is service quality of wireless communication in the wireless communication system. The control device 400 manages and controls QoS of the wireless communication 201 and the wireless communication 202 performed between the wireless communication devices 101 to 106 via the base station 300. The control device 400 manages and controls QoS of the D2D communication 203 between the wireless communication devices 105 and 106 performed under the control of the base station 300.

Here, the control device 400 may be connected to, for example, a policy control and charging rule function (PCRF) related to policy control of an evolved packet core (EPC) via a specific interface. The control device 400 may be connected to, for example, a policy control function (PCF) related to policy control of a 5G/next generation (NG) core via a specific interface. The control device 400 may be, for example, a PCRF of an EPC and a packet data network gate way (P-GW). The control device 400 may be, for example, a PCF, a session management function (SMF), and a user plane function (UPF) of 5G/NG core (5GC). The control device 400 is not limited to this example and may include a mobility management entity (MME) and a serving gateway (S-GW) of the EPC or may be the MME or the S-GW itself. The control device 400 may be called an EPC node, which is a generic term for each logical entity included in the EPC. Further or instead of this, the control device 400 may include an access-mobility management function (AMF) in the 5GC or may be an AMF itself. The control device 400 may be called a 5GC node, which is a generic term for each logical entity included in the 5GC.

When a wireless communication system conforms with a system of 3GPP EUTRA (LTE), a wireless communication device is a UE, a base station is an eNB or an en-gNB, and a control device is an EPC (for example, an MME, a P-GW, an S-GW, or a PCRF). The UE and the eNB or the en-gNB are connected via a Uu interface to perform communication in each protocol of a physical layer, a medium access control (MAC) layer, a radio link control (RLC) layer, and a packet data convergence protocol (PDCP) layer, and a radio resource control (RRC) layer or in coordination with these protocols. The connection between the UE and the eNB or the en-gNB in the RRC layer is referred to as RRC connection. The eNB or the en-gNB and the EPC are connected by an S1 interface. More specifically S1-MME connection is established between the eNB or the en-gNB and the MME and an S1-Uconnection is established between the eNB or the en-gNB and the S-GW. The plurality of eNBs or en-gNBs are connected via an X2 interface. Non-access stratum (NAS) connection can be established between the UE and the MME by NAS signaling.

When the wireless communication system conforms with a system of the 3GPP NR, a wireless communication device is the UE, a base station is the gNB or the ng-eNB, and a control device is the 5GC (for example, an AMF, a UPF, an SMF, or a PCF). The UE is connected with the gNB or the ng-eNB via a Uu interface to perform communication in each protocol of the physical layer, the MAC layer, the RLC layer, the PDCP layer, and a service data adaptation protocol (SDAP) layer, and the RRC layer or in coordination with these protocols. As described above, the connection between the UE and the gNB or the ng-eNB in the RRC layer is referred to as RRC connection. The gNB or the ng-eNB and the 5GC are connected by an NG interface. The plurality of gNBs or ng-eNB can be connected via an Xn interface. The NAS connection can be established between the UE and the AMF by the NAS signaling.

The control device 400 may be a server of the multi-access edge computing (MEC) system in edge computing (also referred to as MEC). The edge computing enables a service to be efficiently provided to a UE (wireless communication device) or an application while reducing an end-to-end delay or a load on a transport network by allowing an access point closed to the UE (wireless communication device) to host a service of a wireless communication operator and a third party. On a server of the MEC system, an MEC host can be virtually constructed using a virtual network function technology. The MEC host can include an MEC platform, a virtualization infrastructure, an MEC application, and an MEC service. The MEC systems may be logically connected via a UPF and an N6 reference point of a 5G/NG core (that is, 5GC).

The input device 500 is a device that inputs information necessary to set the QoS managed by the control device 400. Here, the information necessary to set the QoS is a request condition of a service which is provided to a user. The input device 500 stores the wireless communication devices 101 to 106 in the wireless communication system, connection sources (connection destinations) in which wireless communication bearers are established in the wireless communication devices 101 to 106, and information related to correspondence with the connection destinations (the connection sources). Here, the established wireless communication bearers are default bearers or dedicated bearers. The input device 500 may be disposed in the same physical or logical device as the control device 400 (co-located) or may be disposed in a different physical or logical device (non-co-located).

The control device 400 can set a QoS class indicator (QCI) allocated to the established wireless communication bearer on the basis of the request condition for wireless communication between all the connection sources (the connection destinations) and the connection destinations (the connection sources) acquired via the input device 500 before any of the wireless communication devices 101 to 106 in the wireless communication system starts the wireless communication. The QCI is an index indicating various conditions related to the QoS of the wireless communication bearer.

FIG. 2 is a diagram illustrating part of a definition of the QCI in 3GPP (3GPP TS 23.203). In addition to the definition of the QCI illustrated in FIG. 2, a customized QCI definition and mounting are possible.

The QCIs are classified in accordance with "Resource Type", "Priority Level", "Packet Delay Budget", and "Packet Error Loss".

The "Resource Type" is classified into a guaranteed bit rate (GBR) and a non-guaranteed bit rate (non-GBR: bit rate not guaranteed, best effort). In the resource type of GBR, a minimum guaranteed bit rate (GBR) and a maximum guaranteed bit rate (GBR) can each be set. On the other hand, the resource type of non-GBR, although a bit rate is not particularly guaranteed, an aggregate maximum bit rate (AMBR) can be set in a wireless communication bearer of the non-GBR.

The "Priority Level" means priority levels when packets are transmitted. Packets with high priority levels are preferentially transmitted. Here, as a value indicated by a priority level is smaller, the degree of preference is higher.

The "Packet Delay Budget" is an index indicating an upper limit of an allowable delay of packets transmitted and received between a terminal and a packet data network (PDN) gateway (P-GW), a UPF, or a data network (DN).

The "Packet Error Loss" is an index indicating an upper limit of a ratio of lost packets due to an error of transmission or reception.

For example, for a low latency enhanced mobile broadband (eMBB) application as in augmented reality (AR), a classification of QCI "80" indicating characteristics of the resource type of "non-GBR", the priority level of "6.8", the packet delay budget of "10 ms", and the packet error loss of "10-6" is prepared.

Here, since technical knowledge for wireless communication is necessary to understand such a QCI, it is difficult to appropriately select an index in accordance with the QCI. Therefore, in the embodiment, the request condition of the wireless communication network can be designated in accordance with a more easily understood index.

[Endoscope System]

Figure 3:
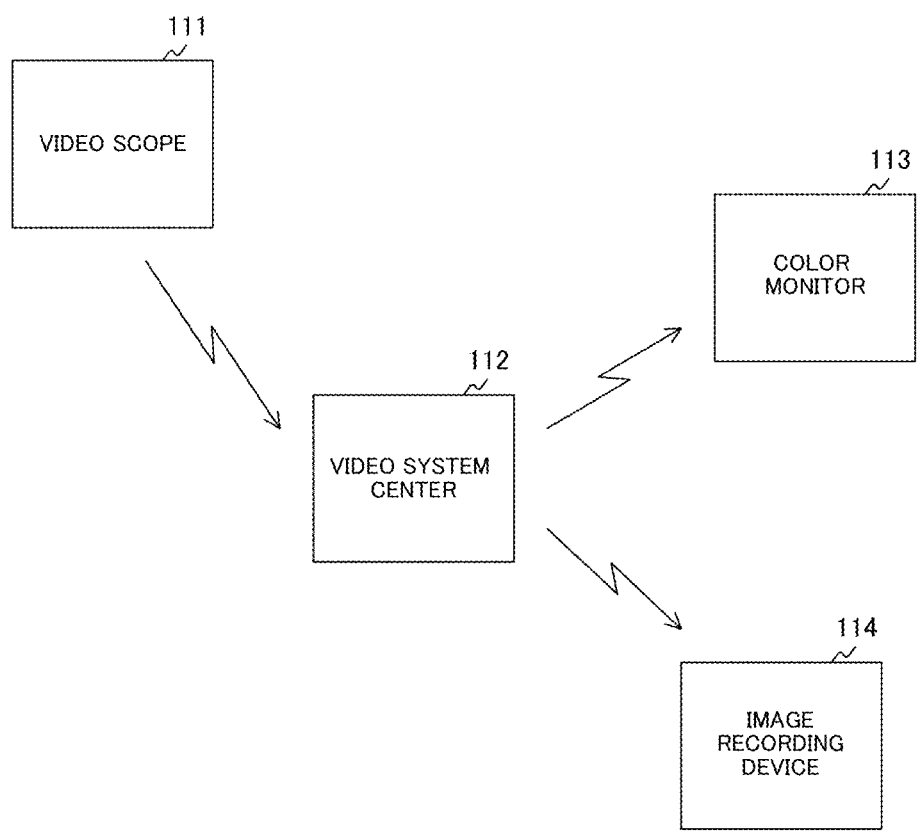
FIG. 3 is a diagram illustrating an overview of an endoscope system as a specific example of the wireless communication system according to the embodiment of the present technology.

FIG. 3 is a diagram illustrating an overview of an endoscope system as a specific example of the wireless communication system according to the embodiment of the present technology.

The endoscope system includes a video scope 111, a video system center 112, a color monitor 113, and an image recording device 114. The video scope 111 is an endoscope for imaging the inside of a human body or the like. The video system center 112 is a device that receives an image from the video scope 111 and transmits the image to the color monitor 113 and the image recording device 114. The color monitor 113 is a monitor that displays colors of the image captured by the video scope 111. The image recording device 114 is a device that records the image captured by the video scope 111 on a recording medium.

The video scope 111, the color monitor 113, and the image recording device 114 are assumed to be connected to the video system center 112 through wireless communication. The image captured by the video scope 111 is transmitted to the video system center 112 through wireless communication and is further transmitted from the video system center 112 to the color monitor 113 and the image recording device 114 through wireless communication. That is, the video scope 111, the video system center 112, the color monitor 113, and the image recording device 114 function as the wireless communication devices (for example, UEs) in the above-described wireless communication system.

FIG. 4 is a diagram illustrating a first setting example of a request condition for the endoscope system according to the embodiment of the present technology.

The endoscope system has at least one of a condition related to image quality (an image quality condition) and a condition related to latency (a latency condition) as the request condition of the wireless communication between devices transmitting and receiving the image captured by the video scope 111. In this example, the image quality condition and the latency condition are set as the request condition. That is, when an image is transmitted from the video scope 111 to the video system center 112, high image quality and low latency are required. Therefore, in this example, image quality of "4K" and latency of "10 ms" are set. Here, 4K means that a resolution has image quality of 3840×2160 pixels.

An image displayed on the color monitor 113 may not have that high image quality, but low latency is required. This is because a user (for example, a doctor) using an endoscope operates the endoscope referring to an image displayed on the color monitor 113. Therefore, in transmission of the image from the video system center 112 to the color monitor 113, image quality of "full HD" and latency of "10 ms" are set in this example. Here, full high definition (HD) means that a resolution has image quality of 1920× 1080 pixels.

An image recorded on the image recording device 114 preferably has high image quality, but the late latency may be allowed. Therefore, in transmission of the image from the video system center 112 to the image recording device 114, image quality of "4K" and latency of "100 ms" are set in this example.

In setting of communication between the devices transmitting and receiving no image, a condition related to a data size (for example, 256 bytes) or a condition related to a data rate (for example, 100 Mbps (bit per second)) may be set instead of the condition related to image quality.

FIG. 5 is a diagram illustrating a second setting example of the request condition for the endoscope system according to the embodiment of the present technology.

In this example, as the request condition of the wireless communication between the devices transmitting and receiving the image captured by the video scope 111, information indicating which condition is prioritized between the image quality condition and the latency condition can be set in addition to the setting in the above-described first example.

That is, when the image is transmitted from the video scope 111 to the video system center 112, the image quality is set to be prioritized without impairing the image quality. When the image is transmitted from the video system center 112 to the color monitor 113, the latency is set to be prioritized so that no latency occurs in the display. When the image is transmitted from the video system center 112 to the image recording device 114, the image quality is set to be prioritized since a few of latency is not a problem.

With regard to the request condition input for each wireless communication device, the control device 400 determines whether to be able to handle the QCIs of all the established wireless communication bearers. Therefore, the control device 400 retains information regarding a frequency bandwidth which can be used by the wireless communication system and calculates a wireless communication capacity from the information regarding the frequency bandwidth. On the basis of the calculated wireless communication capacity it is determined whether to be able to handle the QCIs of all the established wireless communication bearers.

As this determination, the control device 400 transmits a determination result to the input device 500. When this determination result is at least a determination result indicating that the request condition of all the QCIs of the established wireless communication bearers cannot be handled, the input device 500 displays this determination result.

At this time, a manager that has an authority to set the wireless communication system can conceive a re-setting plan to reduce necessary wireless communication resources on the basis of this determination result obtained via the input device 500.

For example, it is conceivable that the request condition related to the image quality of the wireless communication between any connection source (connection destination) and any connection destination (connection source) is changed from 4K to the full HD and a necessary data rate is decreased.

In the example of the above-described endoscope system, it is conceivable that the setting is changed as follows.

FIG. 6 is a diagram illustrating a re-setting example of the first setting example of the request condition for the endoscope system according to the embodiment of the present technology.

In this example when the image is transmitted from the video scope 111 to the video system center 112, the high image quality and the low latency are requested. Therefore, the wireless communication is changed to wired communication to achieve a reduce wireless communication resources in the wireless communication system.

FIG. 7 is a diagram illustrating a re-setting example of a second setting example of the request condition for the endoscope system according to the embodiment of the present technology.

In this example, a route for transmitting the image from the video system center 112 to the image recording device 114 is changed to wireless communication performed via a public network, such as a communication device provided by the communication operator, to reduce wireless communication resources in the wireless communication system.

A request for necessary wireless communication resources may be met by adding a frequency bandwidth such as an unlicensed spectrum or a shared spectrum in accordance with a determination result and increasing the wireless communication capacity. Further, the wireless communication capacity may be increased by increasing the number of base stations 300 within a communication service zone, performing interference control between the base stations 300, and disposing the base stations 300 with high density.

The control device 400 may be set in advance so that, for example, a connection request from a wireless communication device uninvolved in any wireless communication of the wireless communication system is denied, as in the reset video scope 111 in the first setting example or the reset image recording device 114 in the second setting example. That is, a connection request from a device which is not assumed can be denied.

The control device 400 manages information which is necessary for the QoS control and can be dynamically changed in accordance with a use situation of the wireless communication 201, the wireless communication 202, and the D2D communication 203 after a network in the wireless communication system is constructed. As the information necessary for the QoS control, for example, an AMBR or a minimum GBR and a maximum GBR for each QCI are assumed. That is, in the control device 400, when the QoS is provided for wireless communication performed between any wireless communication devices, dynamic control is also necessary in accordance with a communication use situation in the wireless communication.

[Configuration of Control Device and Input Device]

Figure 8:
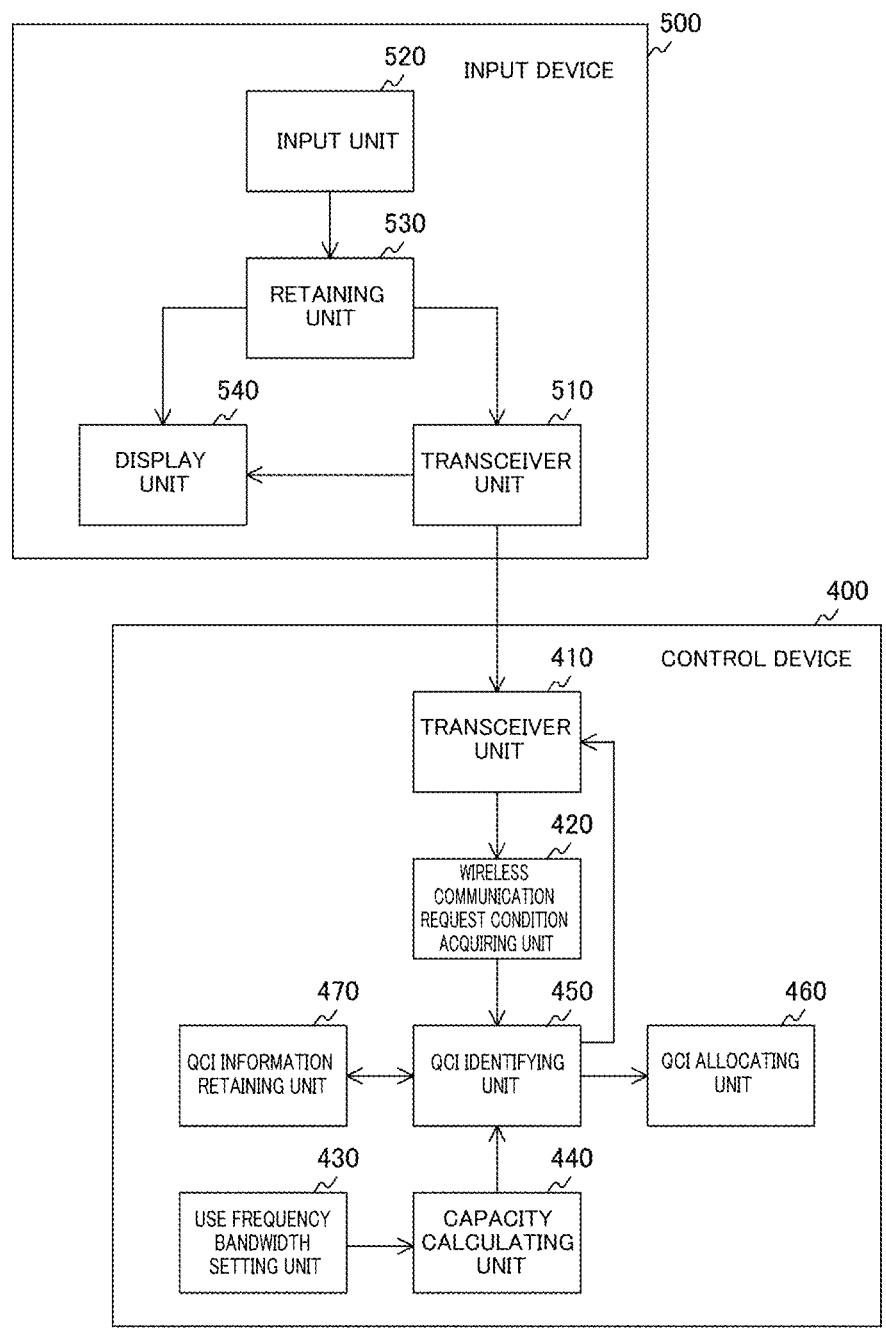
FIG. 8 is a diagram illustrating a configuration example of a control device 400 and an input device 500 according to a first embodiment of the present technology.

FIG. 8 is a diagram illustrating a configuration example of the control device 400 and the input device 500 according to a first embodiment of the present technology. Here, a process of constructing a network in the wireless communication system before communication starts is assumed.

The input device 500 includes an input unit 520, a retaining unit 530, a display unit 540, and a transceiver unit 510. The input unit 520 is a unit used to input a request condition for the wireless communication system on a setting screen or the like. The retaining unit 530 is a unit that retains the input request condition for each device. The display unit 540 is a unit that displays the request condition retained in the retaining unit 530 on a setting screen or the like. For example, the setting screens illustrated in FIGS. 4 to 7 are displayed. The transceiver unit 510 is a unit that transmits the request condition of each device retained in the retaining unit 530 to the control device 400.

For example, in the example of the above-described endoscope, an operator such as a doctor, a nurse, or a helper in a medical site inputs a request condition related to image quality or latency through the input unit 520. As described above, it may be set which condition is prioritized between the image quality and the latency. The operator may necessarily have no wireless technical knowledge.

The control device 400 includes a use frequency bandwidth setting unit 430, a capacity calculating unit 440, a transceiver unit 410, a wireless communication request condition acquiring unit 420, a QCI identifying unit 450, a QCI information retaining unit 470, and a QCI allocating unit 460.

The use frequency bandwidth setting unit 430 sets information regarding a frequency bandwidth used by the base station 300 providing a wireless communication service in a network inside the wireless communication system.

The capacity calculating unit 440 calculates a wireless communication capacity on the basis of the frequency bandwidth set by the use frequency bandwidth setting unit 430. Here, the wireless communication capacity is, for example, a peak data rate which can be provided within a coverage of the base station 300. An effective peak data rate obtained by multiplying the peak data rate by any coefficient (for example, 0.8) may be calculated as a wireless communication capacity.

Here, when N is the number of sub-carriers per frequency bandwidth B [Hz], 64 QAM (6 bits can be transmitted per symbol) is a modulation scheme, $\Delta f$ is a sub-carrier interval, and $\eta$ is an encoding ratio, the peak data rate is calculated from the following expression.

$$\text{Peak data rate} = 6 \cdot \eta \cdot N \cdot \Delta f \, [bps]$$

The transceiver unit 410 receives the request condition for the wireless communication of each wireless communication device from the input device 500 and transmits the determination result to the input device 500 when it is determined that the request condition is not satisfied. The transceiver unit 410 is an example of a notifying unit described in the claims.

The wireless communication request condition acquiring unit 420 acquires the request condition for the wireless communication of each wireless communication device from the input device 500 through the transceiver unit 410. The request condition is assumed to be, for example, a request condition related to image quality (or a data rate) and latency as described above.

The QCI identifying unit 450 identifies an optimum QCI among the QCIs retained by the QCI information retaining unit 470 on the basis of the request condition for the wireless communication of each device acquired by the wireless communication request condition acquiring unit 420, for example, the request condition related to the image quality and the latency. The QCI identifying unit 450 may further identify the QCI on the basis of the setting of the request condition which is acquired by the wireless communication request condition acquiring unit 420 and indicates which condition is prioritized between the image quality and the latency. The QCI identifying unit 450 is an example of a determination unit described in the claims.

The QCI information retaining unit 470 retains numeral values related to the "Resource Type", the "Priority Level", the "Packet Delay Budget", and the "Packet Error Loss" related to the QCIs in the above-described 3GPP. The QCI information retaining unit 470 may retain not only the QCI in the 3GPP as a standard specification but also numeral values uniquely.

The QCI allocating unit 460 allocates the QCI identified by the QCI identifying unit 450 to the wireless communication bearer established for each wireless communication device when the network of the wireless communication system is constructed.

For example, in the above-described example, the QCI identifying unit 450 identifies "80" as the QCI with regard to the image quality of "4K" and the latency of "10 ms" as the request conditions for the wireless communication between the video scope 111 and the video system center 112. The QCI allocating unit 460 allocates "80" as the QCI to the wireless communication bearer established for the wireless communication between the video scope 111 and the video system center 112.

For example, in the above-described example, the QCI identifying unit 450 identifies "7" as the QCI with regard to the image quality of "4K" and the latency of "50 ms" as the request conditions for the wireless communication between the video system center 112 and the image recording device 114. The QCI allocating unit 460 allocates "7" as the QCI to the wireless communication bearer established for the wireless communication between the video system center 112 and the image recording device 114.

When the wireless communication system is formed by two or more base stations 300, the setting of the request condition for connection between the wireless communication devices is performed for each base station 300.

[QCI Identifying Process]

Figure 9:
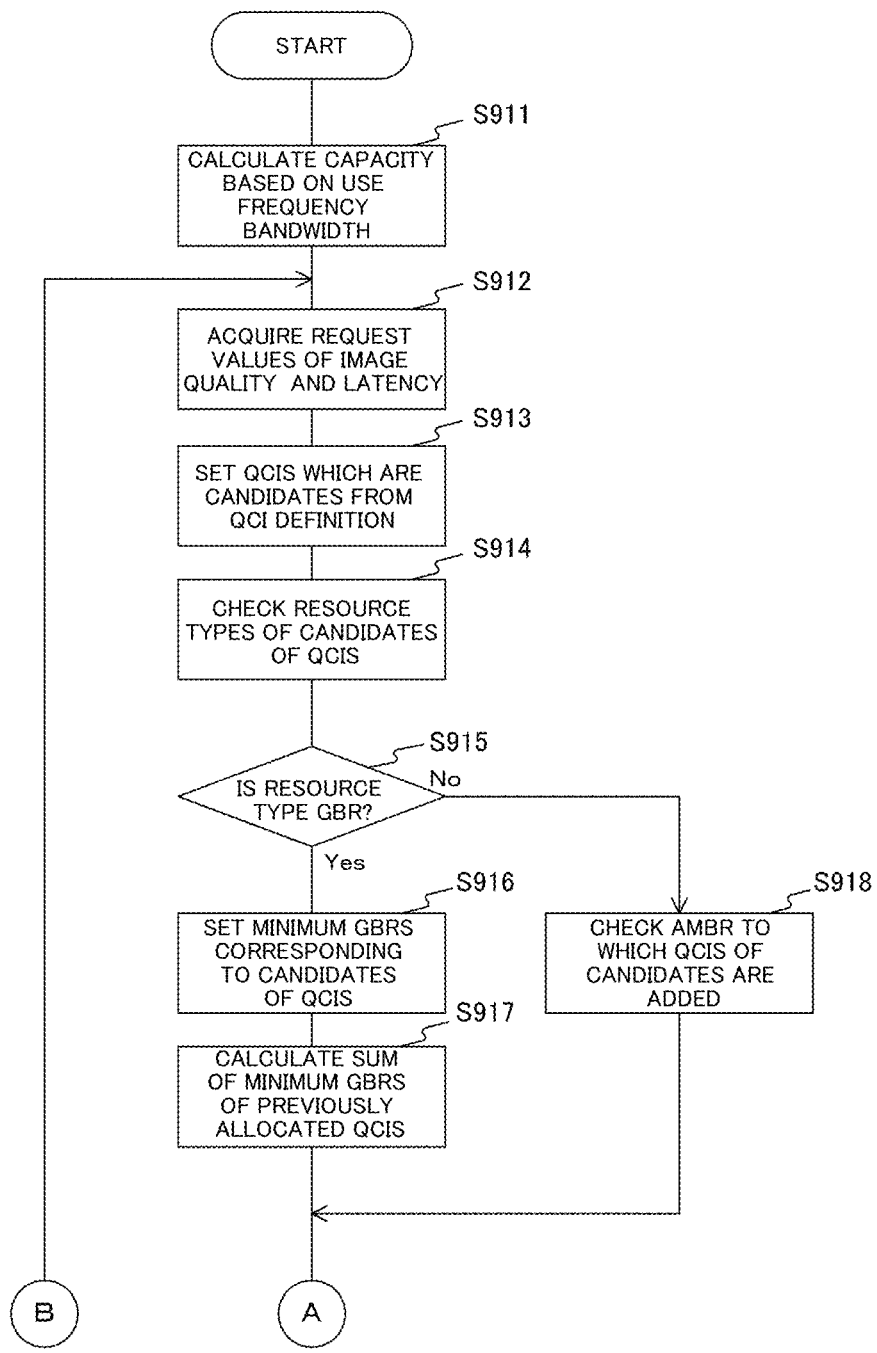
FIG. 9 is the first half of a flowchart illustrating a processing procedure example of a QCI identifying process according to the first embodiment of the present technology.
Figure 10:
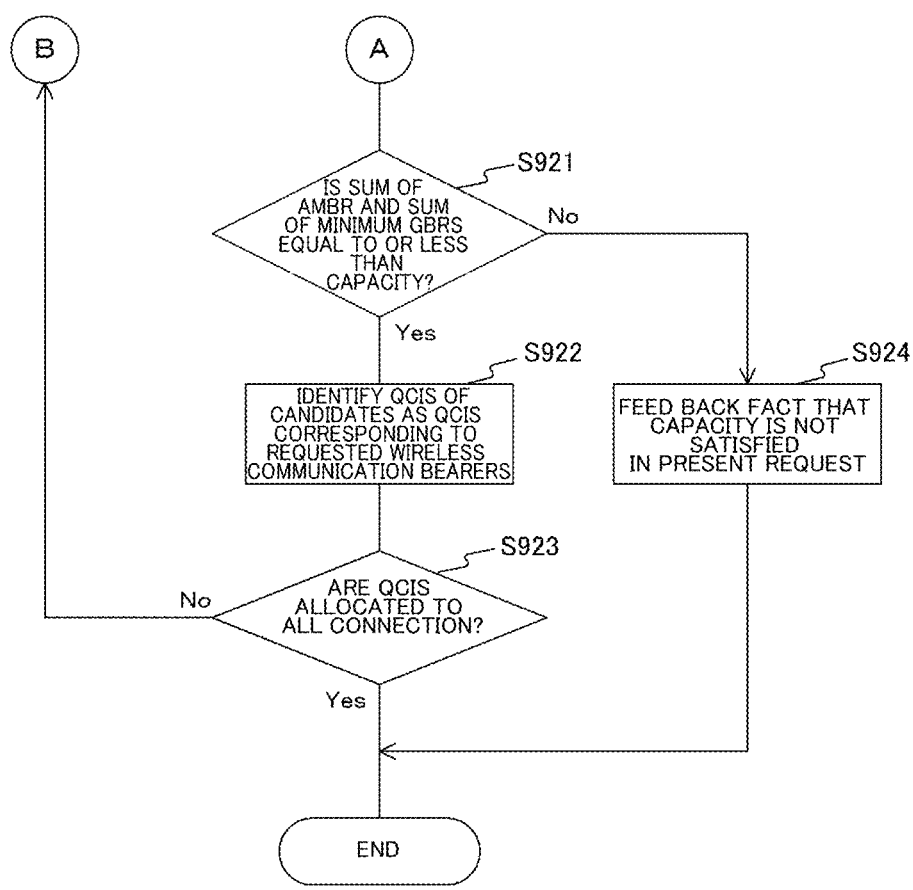
FIG. 10 is the second half of the flowchart illustrating the processing procedure example of the QCI identifying process according to the first embodiment of the present technology.

FIGS. 9 and 10 are flowcharts illustrating a processing procedure example of a QCI identifying process according to the first embodiment of the present technology.

The capacity calculating unit 440 first calculates a wireless communication capacity from a frequency bandwidth used by the base station 300 (step S911). Here, the frequency bandwidth used by the base station 300 is set in the use frequency bandwidth setting unit 430.

The wireless communication request condition acquiring unit 420 acquires the request condition related to the image quality and the latency of the wireless communication between the devices (step S912).

The QCI identifying unit 450 sets the QCIs which are candidates for the request condition related to the image quality and the latency with reference to numeral numbers of QCI definition retained in the QCI information retaining unit 470 (step S913).

The QCI identifying unit 450 checks resource types of the QCIs set as candidates (step S914). When the resource type is the GBR (Yes in step S915), the minimum GBRs corresponding to the QCIs of the candidates is set (step S916) and a sum (total minimum GBR) of the minimum GBRs of all the QCIs of which the previously allocated resource types are the GBR is calculated (step S917).

Conversely, when the resource type is the non-GBR (No in step S915), the AMBR to which the QCIs of the candidates are added is calculated (step S918). Here, the AMBR to which the QCIs of the candidates are added is the AMBR of all the QCIs of which the previously allocated resource types are the non-GBR.

Subsequently it is determined whether a sum of the AMBR and the sum of the minimum GBRs is equal to or less than the wireless communication capacity (step S921). When the sum of the AMBR and the sum of the minimum GBRs is equal to or less than the wireless communication capacity (Yes in step S921), the QCI identifying unit 450 identifies the QCIs of the candidates as the QCIs allocated to the requested wireless communication bearers (step S922). Then, it is determined whether the QCIs are allocated to all the connection (step S923). When it is determined that the QCIs are allocated to all the connection (Yes in step S923), the process ends. Conversely when it is determined that the QCIs are not allocated to all the connection (No in step S923), the process subsequent to step S912 is performed.

Conversely, when it is determined that the sum of the AMBR and the sum of the minimum GBRs is greater than the wireless communication capacity (No in step S921), the fact that the sum is greater than the wireless communication capacity in the current request condition is fed back to the input device 500 via the transceiver unit 410 (step S924).

When the wireless communication system is formed by two or more base stations 300, the above-described QCI identifying process is performed for each base station 300.

In this way in the first embodiment of the present technology, the request condition input to the wireless communication bearers established between all the wireless communication devices in the wireless communication system is compared with the wireless communication capacity calculated from the frequency bandwidth which is used. Thus, on the basis of the wireless communication capacity it can be determined whether the input request condition is satisfied. When it is determined that the input request condition is greater than the wireless communication capacity this determination result is fed back to the side of the input device 500 and urges to reconsider the request condition.

In the first embodiment, when the request condition is input, an easily understandable index such as image quality and latency can be used. Thus, it is easy for even an operator who has wireless technical knowledge to perform an input, and thus it is possible to improve operability.

2. Second Embodiment

In the above-described first embodiment, when the network is constructed in the wireless communication system, it is determined on the basis of the wireless communication capacity whether the wireless communication bearers established between all the wireless communication devices satisfy the request conditions. On the other hand, when administration after the network is constructed, importance can be different for each range in an image supplied from a wireless communication device which is a source. For example, in the example of the above-described endoscope, administration can be performed so that a specific range of a captured image is transmitted with high image quality and the remaining range is transmitted with low equality. Accordingly in a second embodiment, an example in which image processing is dynamically performed after wireless communication starts will be described. Since the entire configuration of the wireless communication system is similar to that of the above-described first embodiment, detailed description will be omitted.

[Configuration of Control Device and Input Device]

Figure 11:
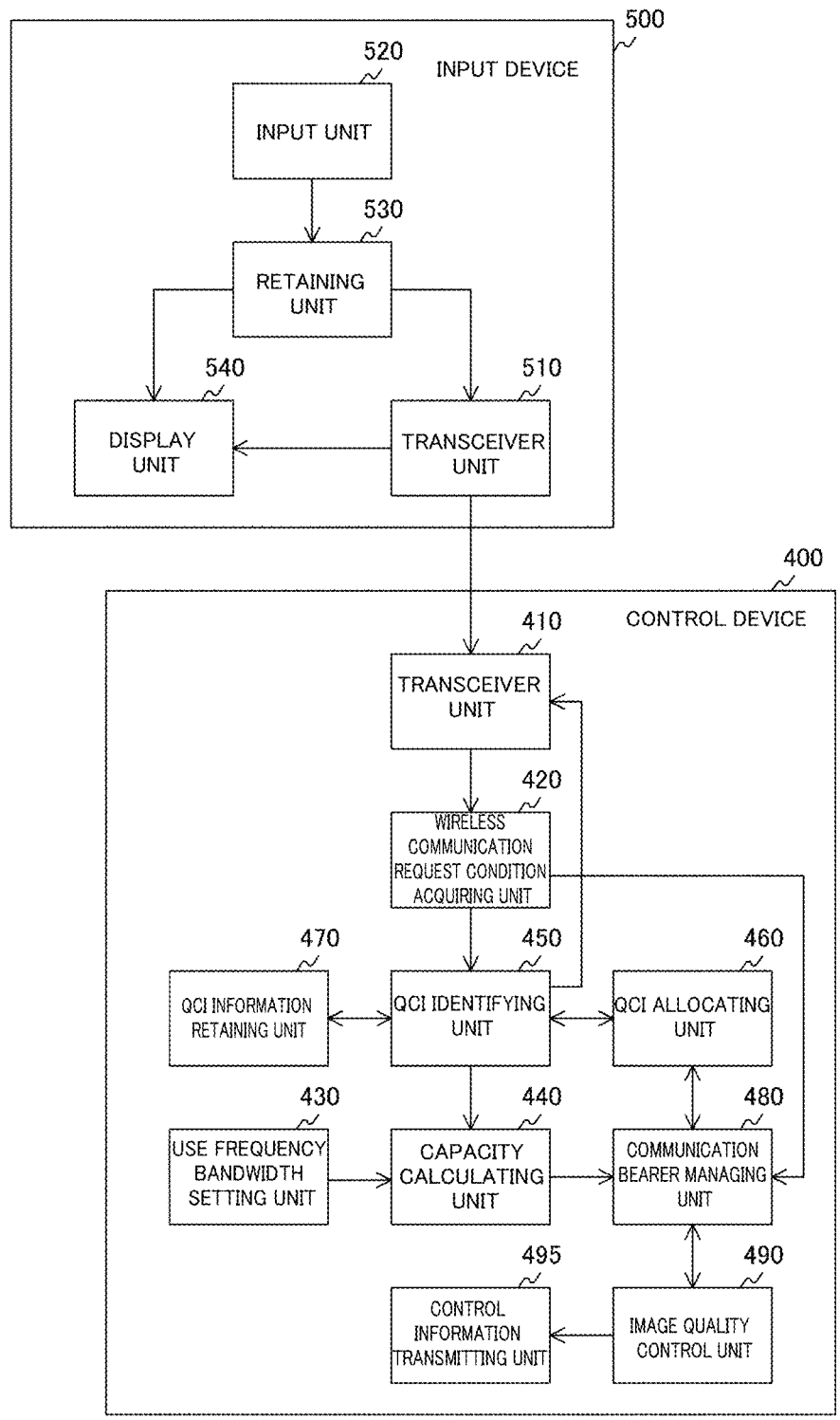
FIG. 11 is a diagram illustrating a configuration example of a control device 400 and an input device 500 according to a second embodiment of the present technology.

FIG. 11 is a diagram illustrating a configuration example of the control device 400 and the input device 500 according to a second embodiment of the present technology Here, a process after a network is constructed in a wireless communication system and communication starts will be assumed.

Since a configuration of the input device 500 in the second embodiment is similar to that of the above-described first embodiment, detailed description will be omitted.

The control device 400 in the second embodiment further includes a communication bearer managing unit 480, an image quality control unit 490, and a control information transmitting unit 495 in addition to the above-described first embodiment.

The communication bearer managing unit 480 manages information regarding the AMBR of the non-GBR for each QCI, a minimum GBR and a maximum GBR of the GBR, and latency from a situation of all the constructed wireless communication bearers and the wireless communication capacity calculated by the capacity calculating unit 440.

The image quality control unit 490 controls quality of an image transmitted in the wireless communication system. After any wireless communication bearer in the wireless communication system is established, the image quality control unit 490 checks a bit rate with regard to any wireless communication bearer with which a moving image is transmitted and received. The control information transmitting unit 495 transmits control information regarding image quality determined by the image quality control unit 490. The image quality control unit 490 and the control information transmitting unit 495 are an example of an image control unit described in the claims.

For example, when the resource type of the identified QCI is the non-GBR, the image quality control unit 490 checks the AMBR in the communication bearer managing unit 480. Here, the AMBR is a total sum of maximum bit rates provided by all the wireless communication bearers which are established wireless communication bearers have the resource type of the non-GBR. The image quality control unit 490 checks whether the AMBR satisfies the request condition related to the image quality on the basis of the request condition related to the image quality acquired by the wireless communication request condition acquiring unit 420 and the AMBR checked by the communication bearer managing unit 480.

When it is determined that the AMBR can satisfy the request condition related to the image quality, the control information transmitting unit 495 instructs an image processing unit (for example, an image processing unit of the video scope 111) of the wireless communication device to perform communication with the image quality requested in the request condition.

Conversely, when it is determined that the AMBR cannot satisfy the request condition related to the image quality, the image quality control unit 490 calculates a range of an image which can be transmitted for each frame time of a minimum unit in the entire range of the image in each frame with an image format (for example, the full HD) corresponding to the request condition related to the image quality on the basis of the AMBR. In the calculation of the range of the image, any wireless communication bearer that has the resource type of the non-GBR and transmits and receives a moving image is a target.

Then, the control information transmitting unit 495 notifies the image processing unit of the wireless communication device of information regarding the range of the image which can be transmitted for each frame time of the minimum unit. Here, when any wireless communication bearer is selected, for example, the wireless communication bearer which is a wireless communication bearer established to connect the devices set with a low image quality priority level and has the resource type of the non-GBR may be preferentially selected.

For example, when the resource type of the identified QCI is the GBR, the image quality control unit 490 checks the minimum GBR in the communication bearer managing unit 480. The image quality control unit 490 checks whether the minimum GBR satisfies the request condition related to the image quality on the basis of the request condition related to the image quality acquired by the wireless communication request condition acquiring unit 420 and the minimum GBR checked by the communication bearer managing unit 480.

At this time, when it is determined that the minimum GBR can satisfy the request condition related to the image quality the control information transmitting unit 495 instructs the image processing unit of the wireless communication device to perform communication with the image quality request in the request condition.

Conversely when it is determined that the minimum GBR cannot satisfy the request condition related to the image quality the image quality control unit 490 calculates a range of an image which can be transmitted for each frame time of a minimum unit in the entire range of the image in each frame with an image format (for example, the full HD) corresponding to the request condition related to the image quality on the basis of the minimum GBR. In the calculation of the range of the image, any wireless communication bearer that is a wireless communication bearer that transmits and receives a moving image and has the resource type of the GBR is a target.

Then, the control information transmitting unit 495 notifies the image processing unit of the wireless communication device of information regarding the range of the image which can be transmitted for each frame time of the minimum unit. Here, when any wireless communication bearer is selected, for example, the wireless communication bearer which is a wireless communication bearer established to connect the devices set with a low image quality priority level and has the resource type of the GBR may be preferentially selected.

[Image Quality Control Process]

Figure 12:
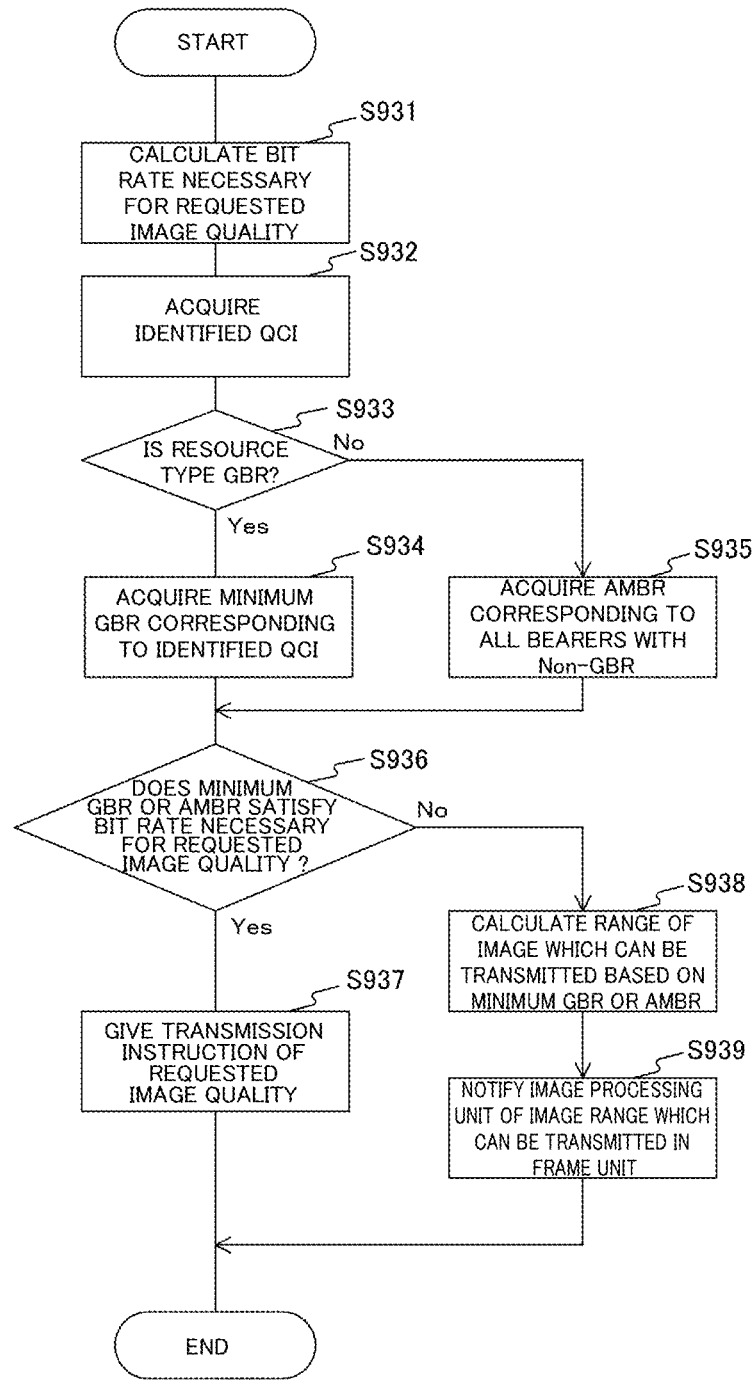
FIG. 12 is a flowchart illustrating a processing procedure example of an image quality control process according to the second embodiment of the present technology.

FIG. 12 is a flowchart illustrating a processing procedure example of an image quality control process according to the second embodiment of the present technology.

The image quality control unit 490 calculates a necessary bit rate on the basis of the request condition related to the image quality acquired by the wireless communication request condition acquiring unit 420 (step S931). For example, when the request condition related to the image quality is an RGB 24 scheme and the full HD of 60 frames per second (fps), the number of bits necessarily transmitted in a frame unit is $$1920 \times 1080 \times 24 = \text{about 50 Mbits}.$$

Accordingly, the number of bits necessarily transmitted in a unit time, that is, a bit rate, is $$50 \text{Mbits} \times 60 = \text{about 3 Gbps}.$$

That is, the request condition related to the image quality and the request condition related to the bit rate have a one-to-one relation.

Subsequently the image quality control unit 490 acquires the QCI identified by the QCI identifying unit 450 (step S932). Since the QCI identifying process is the same as that of the above-described first embodiment, detailed description will be omitted.

Then, it is determined whether the resource type of the identified QCI is the GBR or the non-GBR (step S933). When the resource type is the GBR (Yes in step S933), the image quality control unit 490 acquires the minimum GBR corresponding to the identified QCI from the communication bearer managing unit 480 (step S934). Conversely when the resource type is the non-GBR (No in step S933), the image quality control unit 490 acquires the AMBR which is a total sum of the maximum bit rates provided by all the wireless communication bearers of which the resource type is the non-GBR from the communication bearer managing unit 480 (step S935).

Subsequently in accordance with the resource type, it is determined whether the minimum GBR or the AMBR satisfies the bit rate necessary for the quality (requested image quality) of the request condition (step S936). Here, when the resource type is the non-GBR, a total bit rate is compared with the AMBR. The total bit rate is obtained by adding the bit rate necessary for the requested image quality of the wireless communication bearer to which any QCI of the non-GBR which is a determination target is allocated and the bit rate necessary for the requested image quality of all the other wireless communication bearers to which the QCI of the non-GBR is allocated. When it is determined that the minimum GBR or the AMBR satisfies the bit rate necessary for the requested image quality (Yes in step S936), the image quality control unit 490 gives a transmission instruction of the requested image quality (step S937).

Conversely, when it is determined that the minimum GBR or the AMBR does not satisfy the bit rate necessary for the requested image quality in accordance with the resource type (No in step S936), the range of the image which can be transmitted on the basis of the minimum GBR or the AMBR is calculated (step S938).

For example, when the minimum GBR is 750 Mbps, the number of pixels which can be transmitted in the frame unit is $$750 \text{ [Mbps]}/60 \text{ [fps]}/24 \text{ [bits/pixel]} = 520833 \text{ pixels}.$$

In the case of the same aspect ratio as that of the full HD, 540 pixels×960 pixels are used.

The image quality control unit 490 notifies the image processing unit of the wireless communication device of the number of pixels or the range of the image which can be transmitted in the frame unit (step S939).

When the wireless communication system is formed by two or more base stations 300, the process performed by the image quality control unit 490 is performed for each base station 300.

[Image Processing]

FIG. 13 is a diagram illustrating an exemplary aspect of image processing according to the second embodiment of the present technology.

Here, the image processing unit is provided in each of the wireless communication devices 101 to 106, for example. More specifically the video scope 111 included in the endoscope that supports a wireless communication function is mounted on a virtual reality (VR) head-mounted display (HMD). In this case, each of the wireless communication devices 101 to 106 includes a receiving unit that receives an instruction from the control device 400 and a transmitting unit that supplies an image subjected to image processing to another wireless communication device. Here, the image processing unit may be provided in another device such as the control device 400 or the input device 500.

The image processing unit acquires the information regarding the image quality from the image quality control unit 490. For example, the image quality control unit 490 instructs the image processing unit to perform the transmission with the full HD via the control information transmitting unit 495.

The image quality control unit 490 instructs the image processing unit to transmit a range designated in a screen with the full HD via the control information transmitting unit 495. Here, information outside of the range designated in the screen with the full HD is transmitted in another frame unit (for example, 10 fps), for example. The image processing unit of the receiving side performs a process so that an image within the designated range is updated at 60 fps and an image outside of the designated range is updated at 10 fps. In this way by lowering a frame rate of an image outside of the designated range on the screen with the full HD, it is possible to alleviate a desired bit rate of the wireless communication bearer.

A process of setting a low resolution or a black image (black screen) may be performed on the information outside of the range designated in the screen with the full HD. Thus, it is also possible to alleviate the desired bit rate of the wireless communication bearer.

Control may be performed such that a wireless communication bearer different from the wireless communication bearer for transmitting the information within the range designated in the screen with the full HD is newly established and the information outside of the range designated in the screen with the full HD is transmitted. At this time, the QCI that has a larger packet delay budget is allocated to the newly established wireless communication bearer. Then, the information outside of the designated range is buffered at a time on a transmitting side to be transmitted via the newly established wireless communication bearer. Thus, it is possible to transmit the information regarding the screen with the full HD without being decimated.

At this time, the image processing unit of the receiving side combines and reconstruct the information regarding the image within the designated range transmitted via the other wireless communication bearer and the information regarding the image outside of the designated range in the frame unit. For example, compared to the color monitor 113 included in the endoscope, the request condition of the latency can be alleviated with regard to the transmission to the image recording device 114. Therefore, this scheme is effective. On the other hand, by limiting the range of the image in the color monitor 113 included in the endoscope, it is possible to guarantee real time.

As in a of the drawing, the center of the range designated in the screen with the full HD may be set at a center of initial value setting (default setting).

As in b of the drawing, the center of the designated range may be set arbitrarily on the basis of a control signal linked with an operation on the video scope 111 or the VR head-mounted display. For example, an input unit such as a mouse used to input 2-dimensional information may be provided in an operation unit of the video scope 111 to acquire control information for dynamically changing the center of the designated range through a 2-dimensional operation. For example, a sensor that detects a viewpoint may be provided in the VR head-mounted display and control information for dynamically changing the center of the designated range may be acquired from the sensor.

In the above-described example, the example of the resolution of the full HD has been given, but a resolution is not limited to this example. It is needless to say that another resolution, for example, a standard definition (SD), a high definition (HD), 2K, 4K, or 8K, can also be applied.

[Operation]

Figure 14:
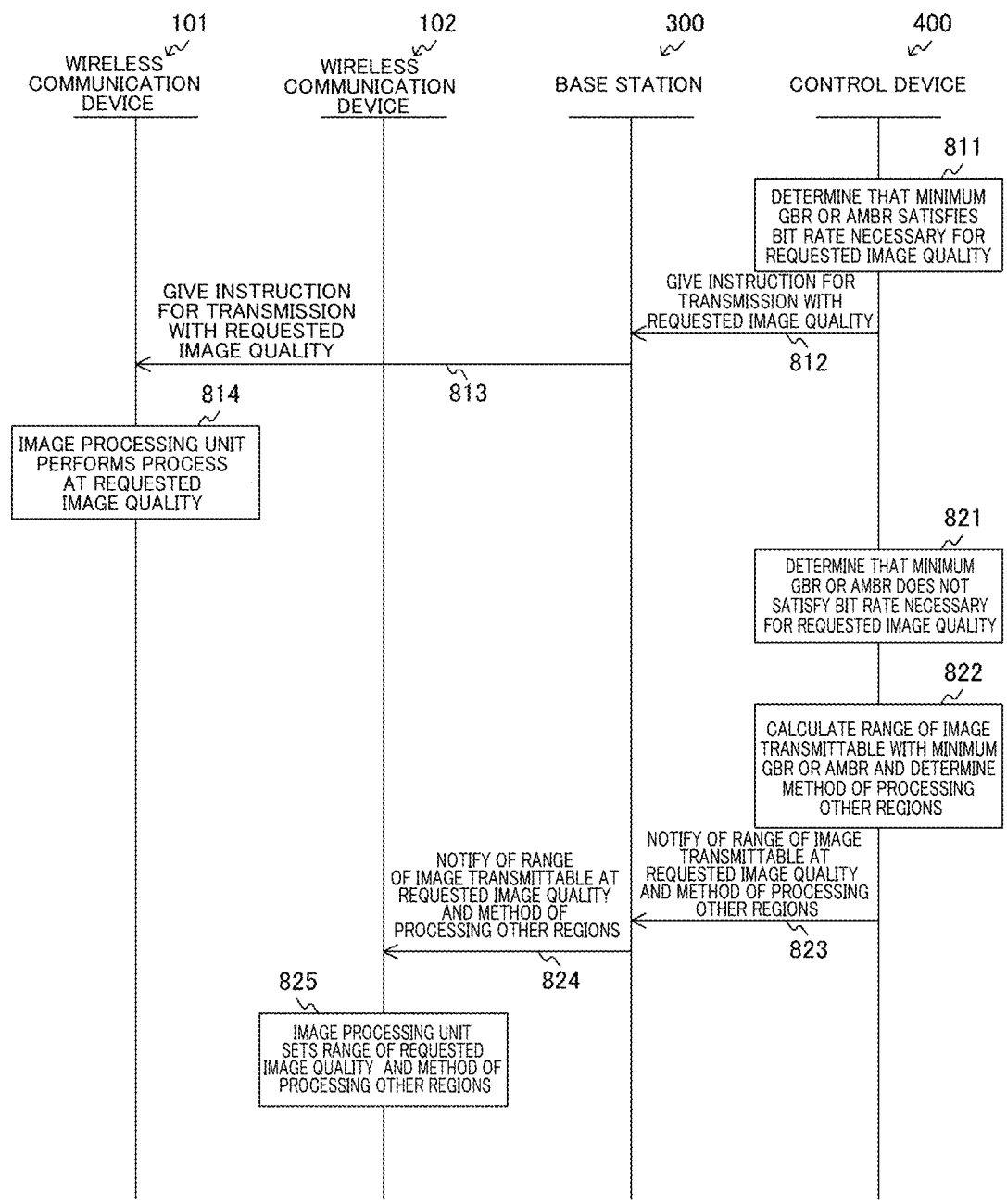
FIG. 14 is a diagram illustrating an example of a signaling flow among wireless communication devices 101 and 102, a base station 300, and the control device 400 according to the second embodiment of the present technology.

FIG. 14 is a diagram illustrating an example of a signaling flow among the wireless communication devices 101 and 102, the base station 300, and the control device 400 according to the second embodiment of the present technology.

On the basis of the above-described image quality control process, the image quality control unit 490 of the control device 400 determines that the minimum GBR or the AMBR of any wireless communication bearer satisfies a bit rate necessary for requested image quality (811). In this case, the image quality control unit 490 transmits control information for giving an instruction for transmission at the requested image quality to the image processing unit of the wireless communication device 101 vis the base station 300 (812 and 813). The image processing unit of the wireless communication device 101 receiving the control information for giving the instruction for transmission at the requested image quality performs setting to perform a process at the request image quality (814).

On the basis of the above-described image quality control process, it is assumed that the image quality control unit 490 of the control device 400 determines that the minimum GBR or the AMBR of any wireless communication bearer does not satisfy the bit rate necessary for the requested image quality (821). In this case, the image quality control unit 490 calculates a range of the image transmittable with the minimum GBR or the AMBR and further determines a method of processing the other regions (822).

The image quality control unit 490 of the control device 400 transmits a message for notifying of the range of the image transmittable at the requested image quality and the method of processing the other regions to the image processing unit of the wireless communication device 102 via the base station 300 (823 and 824). The image processing unit of the wireless communication device 102 receiving the message for notifying of the range of the image transmittable at the requested image quality and the method of processing the other regions sets the range of the requested image quality and the method of processing the other regions (825).

In this way, in the second embodiment of the present technology when the minimum GBR or the AMBR corresponding to the QCI of the wireless communication bearer does not satisfy the bit rate necessary for the requested image quality the image processing unit is notified of the range of the image transmittable at the requested image quality and the method of processing the other regions. Thus, the image processing unit can guarantee the requested image quality in the necessary range of the image by performing different kinds of image processing in the respective ranges of the image.

The above-described embodiment is a mode for carrying out the present technology and the factors in the embodiment have the respective correspondence relation with the specific factors of the invention in the claims. Similarly, the specific factors of the invention in the claims have the respective correspondence relation with the factors with the same names in the embodiment of the present technology. Here, the present technology is not limited to the embodiment and various modifications of the embodiment can be made within the scope of the present technology without departing from the gist of the present technology.

The processing orders described in the above-described embodiment may be ascertained as a method that has a series of orders or may be ascertained as a program causing a computer to perform the series of orders or a recording medium that stores the program. As the recording medium, for example, a compact disc (CD), a MiniDisc (MD), a digital versatile disc (DVD), a memory card, a Blu-ray (registered trademark) disc, or a hard disk can be used. Further, all or part of the program causing a computer to perform the series of orders may be distributed to one device or a plurality of devices and may be dynamically mounted using a technology called virtualization. The one device or the plurality of devices may be a device called a cloud server.

The advantageous effects in the embodiments described in the present specification are merely exemplary and are not limited, and other advantageous effects may be obtained.

The present technology can be configured as follows.

(1) A control device including:
a capacity calculating unit configured to calculate a wireless communication capacity in a wireless network including a plurality of wireless communication devices on the basis of information regarding a frequency bandwidth used in the wireless network;
a wireless communication request condition acquiring unit configured to acquire a request condition of a service provided in wireless communication between predetermined wireless communication devices among the plurality of wireless communication devices; and
a determination unit configured to determine whether all wireless communication bearers established between the predetermined wireless communication devices satisfy the request condition of the service on the basis of the wireless communication capacity.

(2)
The control device according to (1), wherein the request condition of the service includes at least one of an image quality condition and a latency condition.

(3)
The control device according to (1), wherein the request condition of the service includes an image quality condition, a latency condition, and information indicating which condition is prioritized between the image quality condition and the latency condition.

(4)
The control device according to (2) or (3), wherein the request condition of the service includes a data rate condition instead of the image quality condition.

(5)
The control device according to any one of (1) to (4), wherein the determination unit sets a QCI satisfying the request condition of the service as a candidate and determines that all the wireless communication bearers satisfy the request condition of the service when all the wireless communication bearers satisfy the set QCI.

(6)
The control device according to (5), wherein the determination unit determines that all the wireless communication bearers satisfy the request condition of the service when a sum of bit rates corresponding to the set QCI is equal to or less than the wireless communication capacity.

(7)
The control device according to (6), wherein the determination unit uses a minimum guarantee bit rate as the bit rate when a resource type of the set QCI is bit rate guarantee, and uses an aggregate maximum bit rate as the bit rate when the resource type of the set QCI is bit rate non-guarantee.

(8)
The control device according to any one of (1) to (7), further including: a notifying unit configured to notify, when it is determined that all the wireless communication bearers do not satisfy the request condition of the service, that all the wireless communication bearers do not satisfy the request condition of the service.

(9)
The control device according to (8), wherein the wireless communication request condition acquiring unit acquires a request condition of a new service input with regard to the notification, and wherein the determination unit determines whether all the wireless communication bearers established between the predetermined wireless communication devices satisfy the request condition of the new service on the basis of the wireless communication capacity.

(10)
A control device including: a wireless communication request condition acquiring unit configured to acquire a request condition of a service provided with regard to wireless communication between predetermined wireless communication devices forming a wireless network; and
an image control unit configured to generate a bit rate necessary to satisfy the request condition of the service and perform image supply control on a wireless communication device of an image supply source in accordance with whether a wireless communication bearer established between the predetermined wireless communication devices satisfies the generated bit rate.

(11)
The control device according to (10), wherein the image control unit acquires a bit rate corresponding to a QCI identified for the wireless communication bearer and performs the image supply control in accordance with whether the bit rate corresponding to the QCI satisfies the generated bit rate.

(12)
The control device according to (11), wherein, when the bit rate corresponding to the QCI does not satisfy the generated bit rate, the image control unit calculates a transmittable range of an image at the bit rate corresponding to the QCI and notifies the wireless communication device of the image supply source of the range.

(13)
The control device according to (12), wherein the image control unit notifies of the range of the image in a frame unit.

(14)
The control device according to (12) or (13), wherein the image control unit notifies of a method of processing a range other than the range along with the range of the image.

(15)
The control device according to (14), wherein the method of processing the range other than the range of the image is a method of decreasing a frame rate more than in the range of the image.

(16)
The control device according to (14), wherein the method of processing the range other than the range of the image is a method of decreasing a resolution more than in the range of the image.

(17)
A wireless communication device including:
a receiving unit configured to receive an instruction of a transmittable range of an image and a request condition of a service to be provided in a wireless communication bearer established with another wireless communication device forming a wireless network;
an image processing unit configured to perform image processing on a predetermined image in response to the instruction; and
a transmitting unit configured to supply the image subjected to the image processing to the other wireless communication device.

(18)
A method of controlling a wireless network, including:
a procedure in which a capacity calculating unit calculates a wireless communication capacity in a wireless network including a plurality of wireless communication devices on the basis of information regarding a frequency bandwidth used in the wireless network;

a procedure in which a wireless communication request condition acquiring unit acquires a request condition of a service provided in wireless communication between predetermined wireless communication devices among the plurality of wireless communication devices; and a procedure in which a determination unit determines whether all wireless communication bearers established between the predetermined wireless communication devices satisfy the request condition of the service on the basis of the wireless communication capacity.

(19)

A method of controlling a wireless network, including:

a procedure in which a wireless communication request condition acquiring unit acquires a request condition of a service provided with regard to wireless communication between predetermined wireless communication devices forming a wireless network; and a procedure in which an image control unit generates a bit rate necessary to satisfy the request condition of the service and performs image supply control on a wireless communication device of an image supply source in accordance with whether a wireless communication bearer established between the predetermined wireless communication devices satisfies the generated bit rate.

REFERENCE SIGNS LIST 101 to 106 Wireless communication device
111 Video scope
112 Video system center
113 Color monitor
114 Image recording device
300 Base station
400 Control device
410 Transceiver unit
420 Wireless communication request condition acquiring unit
430 Use frequency bandwidth setting unit
440 Capacity calculating unit
450 QCI identifying unit
460 QCI allocating unit
470 QCI information retaining unit
480 Communication bearer managing unit
490 Quality controlling unit
495 Control information transmitting unit
500 Input device
510 Transceiver unit
520 Input unit
530 Retaining unit
540 Display unit

The invention claimed is:

1. A control device comprising:
   circuitry configured to
      acquire a request condition of a service provided with regard to wireless communication between predetermined wireless communication devices forming a wireless network;
      identify a bit rate necessary to satisfy the request condition of the service and perform image supply control on a wireless communication device of an image supply source in accordance with whether a wireless communication bearer established between the predetermined wireless communication devices satisfies the identified bit rate,
      acquire a bit rate corresponding to an index indicating a condition related to a quality of service (QoS) identified for the wireless communication bearer and perform the image supply control in accordance with whether the bit rate corresponding to the index indicating the condition related to the QoS satisfies the identified bit rate, and
      in response to the bit rate corresponding to the index indicating the condition related to the QoS not satisfying the identified bit rate, calculate a transmittable range of an image at the bit rate corresponding to the index indicating the condition related to the QoS and notify the wireless communication device of the image supply source of the range.

2. The control device according to claim 1, wherein the circuitry is further configured to notify the range of the image in a frame unit.

3. The control device according to claim 1, wherein the circuitry is further configured to notify a method of processing a range other than the range along with the range of the image.

4. The control device according to claim 3, wherein the method of processing the range other than the range of the image is a method of decreasing a frame rate more than in the range of the image.

5. The control device according to claim 3, wherein the method of processing the range other than the range of the image is a method of decreasing a resolution more than in the range of the image.

6. The control device according to claim 1, wherein the request condition of the service includes at least one of a quality condition and a latency condition.

7. The control device according to claim 6, wherein the request condition of the service further includes information indicating which condition is prioritized between the condition related to image quality and the latency condition.

8. The control device according to claim 1, wherein a priority level for classifying indexes indicating various conditions related to the QoS is a priority level when packets are transmitted, and packets with high priority levels are preferentially transmitted.

9. The control device according to claim 1, wherein a center of the range of the image is set in linkage with an operation of the wireless communication device.

10. The control device according to claim 1, wherein a center of the range of the image is set in linkage with an input included in the wireless communication device.

11. The control device according to claim 1, wherein a center of the range of the image is set in linkage at a viewpoint detected by a sensor included in the wireless communication device.

12. The control device according to claim 1, wherein the wireless communication between predetermined wireless communication devices is device-to-device (D2D) communication.

13. A method of controlling a wireless network, the method comprising:
   acquiring a request condition of a service provided with regard to wireless communication between predetermined wireless communication devices forming a wireless network is acquired;
   identifying a bit rate necessary to satisfy the request condition of the service and performing image supply control on a wireless communication device of an image supply source in accordance with whether a wireless communication bearer established between the predetermined wireless communication devices satisfies the identified bit rate, acquiring a bit rate corresponding to an index indicating a condition related to a quality of service (QoS) identified for the wireless communication bearer and performing the image supply control in accordance with whether the bit rate corresponding to the index indicating the condition related to the QoS satisfies the identified bit rate; and in response to the bit rate corresponding to the index indicating the condition related to the QoS not satisfying the identified bit rate, calculating a transmittable range of an image at the bit rate corresponding to the index indicating the condition related to the QoS and notifying the wireless communication device of the image supply source of the range.

14. A wireless communication network comprising:

one or more wireless communication devices;

a base station device; and a controller configured to acquire a request condition of a service provided with regard to wireless communication between predetermined wireless communication devices under management of the base station device, identify a bit rate necessary to satisfy the request condition of the service and perform image supply control on a wireless communication device of an image supply source in accordance with whether a wireless communication bearer established between the predetermined wireless communication devices satisfies the identified bit rate, acquire a bit rate corresponding to an index indicating a condition related to a quality of service (QoS) identified for the wireless communication bearer and perform the image supply control in accordance with whether the bit rate corresponding to the index indicating the condition related to the QoS satisfies the identified bit rate, and in response to the bit rate corresponding to the index indicating the condition related to the QoS not satisfying the identified bit rate, calculate a transmittable range of an image at the bit rate corresponding to the index indicating the condition related to the QoS and notify the wireless communication device of the image supply source of the range.

* * * * *